G. B. WILLIAMS.
DIRECTION SIGNAL.
APPLICATION FILED JUNE 26, 1917.
1,330,668.
Patented Feb. 10, 1920.
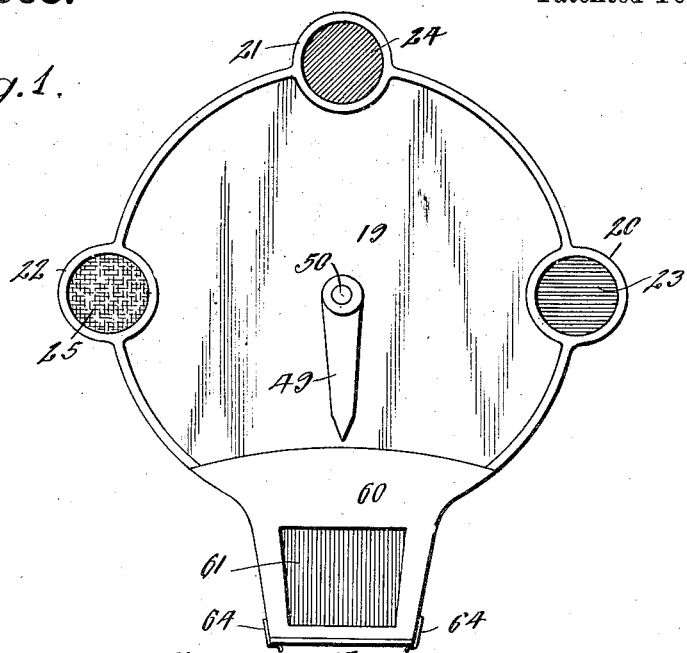
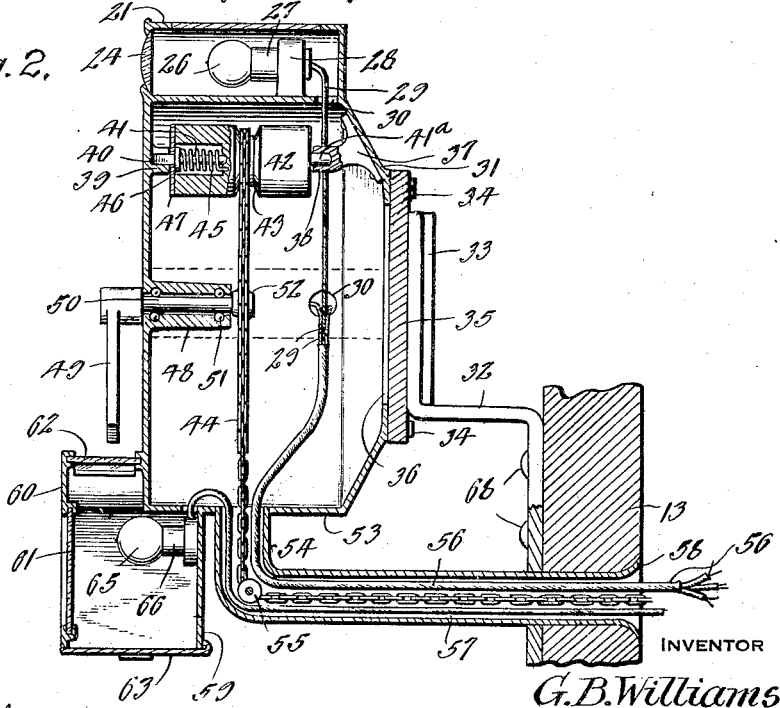
WITNESSES
INVENTOR
G. B. Williams,
BY Victor J. Evans
ATTORNEY

UNITED STATES PATENT OFFICE.

GEORGE BOYSIE WILLIAMS, OF GARY, INDIANA.

DIRECTION-SIGNAL.

1,330,668.  Specification of Letters Patent.  Patented Feb. 10, 1920.

Application filed June 26, 1917. Serial No. 177,078.

*To all whom it may concern:*

Be it known that I, GEORGE B. WILLIAMS, a citizen of the United States, residing at Gary, in the county of Lake and State of Indiana, have invented new and useful Improvements in Direction-Signals, of which the following is a specification.

This invention is a direction signal of a class more particularly adapted for use upon self-propelled vehicles, which signal may be used either by day or by night, and which embodies a constantly burning night signal.

Modern traffic conditions and the higher speeds of vehicles make it necessary that a warning be given in ample time by the driver of a vehicle of his intentions when stopping or changing his direction of travel.

Some sort of signal must be given, for if not a following vehicle is liable to pass when the leader is about to make a turn, as across traffic, and thereby cause an accident. Signals are usually given by hand, which signals are not always clearly distinguishable or seen at night, and are nearly always interchangeable, as for instance with a left-hand drive the driver when pulling toward the curb extends his left hand as though he desired to turn to the left.

A direction signal of proper construction should give its warnings in an unmistakable manner, so as not to be confused, and they should be given by the driver in advance of his contemplated change of traveling direction. The signal should also be one that may be easily and quickly operated, so that it may be effective, for if not there is a liability of its not being used, so that in an emergency its value may be realized.

Therefore, to accomplish these several functions, this invention aims to provide a signal that is easily and readily operated with a minimum amount of labor, one that is not confusing in its warnings, one that will give a warning by day or by night, and one that will produce signals at both the front and rear of the vehicle so that the signal may be viewed simultaneously by the traffic officer and a following driver.

Another object is to provide a signal that will consist of few parts, simple and strong in construction, with its several parts so arranged as to be readily accessible for repairs or replacements, and also one that may utilize different classes of illuminants for the constantly burning night signal.

One practical form of construction, assembly, and circuiting arrangement will be described and illustrated in the accompanying drawings, in which:—

Figure 1 is a front view of the invention.

Fig. 2 is a vertical section thereof.

In Fig. 1 the face 19 of one of the lamp houses is shown as being substantially circular in outline, and three compartments 20, 21 and 22 are mounted on the periphery of the upper half of the circular housing, the middle compartment being situated 90 degrees from each of the others.

Disposed in each of the compartments upon its facing side are colored glasses. In the compartment 20 there is a blue glass, in the compartment 21 there is a yellow glass, and in the compartment 22 there is a purple glass, the glasses disposed in these several compartments being indicated by the numerals 23, 24 and 25. Disposed in each of these compartments are electric lamps, one of which is shown at 26. These lamps may be provided with the usual sockets 27, which sockets may be carried in a suitable support 28. The sockets and support may be so formed as to permit of a suitable connection for the circuit wires indicated at 29.

As shown, these compartments are preferably cylindrical and are so formed that they will not communicate with each other, so that there will be no confusion due to indirect illumination of the improper compartment. To permit the circuit wires to enter the compartments, suitable apertures are formed, one of which is shown at 30.

The back wall of the lamp house indicated at 31 may be formed in any usual manner, and upon its exterior face there may be disposed suitable attaching means to secure the lamp house to the bracket 32. This attaching or securing means may be the slotted member indicated at 33, having the usual or customary attaching screws or bolts 34. The base portion 35 of this slotted member 33 may be so formed as to provide a closure for the aperture 36 formed in the back wall 31 of the lamp house.

Disposed beneath the compartment 21 and upon the back wall 31 is a bracket 37, which is provided with a bearing end 38. Upon the wall 19 there are disposed lugs indicated at 39, which are spaced apart at their upper sides so as to permit entrance of the angularly formed end 40 of the shaft 41. The shaft 41 has mounted thereon a spool 42, which is provided centrally with a constricted portion 43. In this constricted portion 43, the flexible element 44 is secured in any suitable or convenient way. The other portion of the spool 42 is provided with a socket in which there is disposed a spring 45, one end of which is embedded in the spool, while the other end is coöperatively connected to a washer 46 carried adjacent the angular end 40.

In order to hold the shaft 41, the flange 46 and its connecting spring 45 in an operative relation, the cover plate 47 is employed, which may be secured to the spool in any convenient or usual manner. As shown in Fig. 2, the right hand portion of the spool 42 is carried in a stub shaft 41ª, which is adapted to rotate in the bearing 38.

Disposed substantially centrally of the face or front wall 19 and extending inwardly from the inner face or side thereof is a box 48, which may be provided with the usual anti-friction bearings. The indicator 49 is secured to a shaft 50, that is adapted to rotate within the bearings 51. The shaft 50 carries at its other end exterior of the box 48 a sprocket wheel 52.

The flexible element 44 is shown as being a chain, although if desired it may be made of any other suitable material that will serve the same purpose and perform the same function. The movement of this chain 44, which is coöperatively connected with the sprocket 52 will produce a rotary movement of the indicator 49. Thus the indicator 49 may be positioned differently according to the signal that is desired to be given. This is especially valuable during day-light traveling under ordinary traffic conditions.

The lower wall of the lamp house indicated at 53 is provided with an aperture to which may be secured a conduit or other pipe which serves to permit the chain 44 to pass therethrough and around a guide pulley 55, as the conduit 54 has formed therein a right angular bend, shown in Fig. 2. This conduit 54 also affords a place for the cables 56 and 57. The conduit 54 is adapted to pass through a suitable aperture formed in the bracket 32, and into the back wall 13 of the automobile. As shown this conduit is provided with a flared end 58 so as to provide an easy entrance for the several cables and chain.

Disposed upon the lower half or portion of the lamp house is another compartment, the rear wall of which is indicated at 59, and the front wall at 60. The front wall extends in a vertical direction, and is provided with suitable flanges which are adapted to coöperate with a colored glass shown at 61. The front wall 60 of this compartment is spaced away from the front wall 19 of the lamp house, and interposed between the two walls is a transparent substance or white glass 62. The position of this glass 62 is more clearly shown in Fig. 2, where it rests between suitable flanges, formed at the top of the compartment and the top wall 19 of the lamp house. This compartment is provided at its lower end with a removable plate or wall 63 which at one face is provided with a recurved portion adapted to coöperate with a suitable rounded portion formed upon the rear wall 59.

To hold the removable plate 63 in position, the spring clips 64 may be employed. This compartment is adapted to contain a lamp 65 which may have a socket 66 to which are connected the circuit wires formed as a cable indicated at 57. This compartment is utilized for the purpose of giving a constantly burning night signal, and the glass in the front thereof, shown at 61, is preferably red. Should at any time the lamp 65 be burned out, and no other lamp available to replace it, or should the electrical system be disarranged, the lamp 65 may be removed from its socket and another source of illumination or class of illuminant may be employed.

The bracket 32 is so formed that one portion thereof is spaced away from the vehicle so that the lamp house may be positioned out of contact with the ends of said vehicle. The lower end of the bracket may be secured to the part 13 of the automobile in any suitable manner, one means being shown by the rivets 68.

The chain 44 may be carried to any desired type of operating means which is preferably located adjacent the driver's seat. The conductors 56 and 57 are also carried to a suitable source of electrical supply and the current through these conductors is suitably controlled by switches or the like.

What is claimed as new is:—

1. A device of the class described comprising a circular housing, an indicator carried thereby, a lamp casing located at each side on the periphery of said housing, a lamp casing at the top of said housing and a fourth casing at the bottom of said housing, all of said casings having transparent faces of different colors and the bottom casing projecting beyond the housing and having a transparent plate in its top and means for moving the indicator.

2. A device of the class described comprising a housing, a shaft carried by the housing, an indicator secured to the shaft, a spring roller located in the housing, a connection secured to said roller and engaging with the shaft for rotating the indicator, means for operating said connection from a point adjacent the driver's seat, and indicating means on the housing coöperating with the indicator.

In testimony whereof I affix my signature.

GEORGE BOYSIE WILLIAMS.